(12) United States Patent
Inoue et al.

(10) Patent No.: US 11,648,984 B2
(45) Date of Patent: May 16, 2023

(54) STRUCTURE OF VEHICLE

(71) Applicants: TOYOTA JIDOSHA KABUSHIKI KAISHA, Toyota (JP); SUBARU CORPORATION, Tokyo (JP)

(72) Inventors: Shotaro Inoue, Nisshin (JP); Marie Sakata, Toyota (JP); Masayuki Tado, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 50 days.

(21) Appl. No.: 17/400,972

(22) Filed: Aug. 12, 2021

(65) Prior Publication Data

US 2022/0081034 A1 Mar. 17, 2022

(30) Foreign Application Priority Data

Sep. 17, 2020 (JP) .............................. JP2020-156274

(51) Int. Cl.
| | | |
|---|---|---|
| *B62D 21/15* | (2006.01) | |
| *B62D 25/14* | (2006.01) | |
| *B60R 11/04* | (2006.01) | |
| *B60R 11/02* | (2006.01) | |
| *B60R 21/34* | (2011.01) | |
| *B60R 11/00* | (2006.01) | |
| *B60K 37/04* | (2006.01) | |

(52) U.S. Cl.
CPC .......... *B62D 21/152* (2013.01); *B62D 25/14* (2013.01); *B60K 37/04* (2013.01); *B60K 2370/152* (2019.05); *B60K 2370/63* (2019.05); *B60R 11/00* (2013.01); *B60R 11/02* (2013.01); *B60R 11/0229* (2013.01); *B60R 11/04* (2013.01); *B60R 21/34* (2013.01); *B60R 2011/0005* (2013.01); *B60R 2011/008* (2013.01); *B60R 2011/0049* (2013.01); *B60R 2021/343* (2013.01)

(58) Field of Classification Search
CPC .................. B62D 21/152; B62D 25/14; B60K 2370/152; B60K 2370/63; B60K 37/04; B60R 2021/343; B60R 21/34; B60R 11/04; B60R 11/00; B60R 11/0229; B60R 2011/005; B60R 2011/0049; B60R 2022/008; B60R 11/02
USPC .................................................... 296/187.09
See application file for complete search history.

(56) References Cited

U.S. PATENT DOCUMENTS

| | | | | |
|---|---|---|---|---|
| 7,143,856 | B2 * | 12/2006 | Takahashi | ........... B60R 21/0136 280/735 |
| 7,370,719 | B2 * | 5/2008 | Sakamoto | .............. B62D 25/14 296/70 |
| 2019/0260060 | A1 * | 8/2019 | Kamiyama | .............. B60K 1/04 |

FOREIGN PATENT DOCUMENTS

| | | |
|---|---|---|
| JP | 2019-142357 A | 8/2019 |
| JP | 2019-147490 A | 9/2019 |
| JP | 2019147490 A * | 9/2019 |

* cited by examiner

*Primary Examiner* — Joseph D. Pape
*Assistant Examiner* — Dana D Ivey
(74) *Attorney, Agent, or Firm* — Oliff PLC (57) ABSTRACT

A structure of a vehicle disclosed herein may include: a windshield; an instrument panel located below the windshield; in-vehicle equipment disposed such that the in-vehicle equipment projects upward above an upper surface of the instrument panel and is fixed to the instrument panel; and an impact relieving mechanism configured to, when a rearward and downward collision load is applied to the in-vehicle equipment, relieve the collision load by moving the in-vehicle equipment rearward and downward.

5 Claims, 6 Drawing Sheets

STRUCTURE OF VEHICLE

CROSS-REFERENCE TO RELATED APPLICATION

This application claims priority to Japanese Patent Application No. 2020-156274 filed on Sep. 17, 2020, the contents of which are hereby incorporated by reference into the present application.

TECHNICAL FIELD

The technique disclosed herein relates to a structure of a vehicle.

BACKGROUND

A structure of a vehicle in which in-vehicle equipment is disposed such that the in-vehicle equipment projects upward above an upper surface of the instrument panel is known, and one example of such a structure is described in Japanese Patent Application Publication No. 2019-147490.

SUMMARY

If an accident in which a vehicle hits a pedestrian occurs, a head of the pedestrian may collide into a windshield of the vehicle. At this occasion, with the aforementioned structure of the vehicle, the windshield and the in-vehicle equipment are in proximity to each other, thereby the head may collide into the in-vehicle equipment through the broken windshield. If the head collides into the in-vehicle equipment, a downward and rearward collision load is applied to the in-vehicle equipment. A technique for relieving such a collision load is required.

A structure of a vehicle disclosed herein may comprise: a windshield; an instrument panel located below the windshield; in-vehicle equipment disposed such that the in-vehicle equipment projects upward above an upper surface of the instrument panel and is fixed to the instrument panel: and an impact relieving mechanism configured to, when a rearward and downward collision load is applied to the in-vehicle equipment, relieve the collision load by moving the in-vehicle equipment rearward and downward.

In the aforementioned structure of the vehicle, the impact relieving mechanism can move the in-vehicle equipment rearward and downward when the rearward and downward collision load relative to the vehicle is applied to the in-vehicle equipment. Due to this, in the aforementioned structure of the vehicle, the collision load applied to the in-vehicle equipment can be relieved.

DETAILED DESCRIPTION

An embodiment of a structure of a vehicle disclosed herein may comprise: a windshield; an instrument panel located below the windshield; in-vehicle equipment disposed such that the in-vehicle equipment projects upward above an upper surface of the instrument panel and is fixed to the instrument panel; and an impact relieving mechanism configured to, when a rearward and downward collision load is applied to the in-vehicle equipment, relieve the collision load by moving the in-vehicle equipment rearward and downward. The in-vehicle equipment may be directly fixed to the instrument panel, or may be indirectly fixed thereto via other member(s). A type of the in-vehicle equipment is not particularly limited, and may be for example a display configured to digitally display measurement values (e.g., a speed, a rotation speed of an engine or a motor) or a camera module configured to capture outside and/or inside a vehicle cabin.

The structure of the above embodiment may further comprise a cover panel. The cover panel may be provided on the upper surface of the instrument panel and cover the in-vehicle equipment such that a front surface of the in-vehicle equipment is exposed to a vehicle cabin. The cover panel may be configured as a member different from the instrument panel, or may be configured integrally with the instrument panel.

In the structure of the above embodiment, the in-vehicle equipment may comprise a first clip projecting frontward from a rear surface of the in-vehicle equipment. In addition, the cover panel may comprise a first fitting hole into which the first clip fits. In this embodiment, the in-vehicle equipment is indirectly fixed to the instrument panel via the cover panel by the first clip of the in-vehicle equipment being inserted into the first fitting hole in the cover panel.

In the structure of the above embodiment, the cover panel may include a part defining an upper wall of the first fitting hole, and the impact relieving mechanism may comprise a slit defined in the part of the cover panel and extending upward from the first fitting hole. In this embodiment, when the rearward and downward collision load is applied to the in-vehicle equipment, the first clip can be detached from the first fitting hole through the slit. Due to this, when the rearward and downward collision load is applied to the in-vehicle equipment, the in-vehicle equipment can move rearward and downward, by which the collision load applied to the in-vehicle equipment can be relieved.

In the structure of the above embodiment, the impact relieving mechanism may comprise a bracket located below the first clip and facing the first clip. In this embodiment, when the rearward and downward collision load is applied to the in-vehicle equipment, the bracket makes contact with the first clip and can apply an upward load to the first clip. Due to this, the bracket can facilitate breakage of the first clip or detachment of the first clip from the first fitting hole. Consequently, when the rearward and downward collision load is applied to the in-vehicle equipment, the in-vehicle equipment can move rearward and downward, by which the collision load applied to the in-vehicle equipment can be relieved. In particular, in the embodiment in which the slit that extends upward from the first fitting hole is defined, providing such a bracket can effectively facilitate the detachment of the first clip from the first fitting hole.

In the structure of the above embodiment, the relieving mechanism may comprise a guide member located below the in-vehicle equipment. The guide member may comprise an inclined surface inclined rearward and downward and facing a bottom surface of the in-vehicle equipment. In this embodiment, when the rearward and downward collision load is applied to the in-vehicle equipment, the bottom surface of the in-vehicle equipment makes contact with the inclined surface of the guide member, by which the in-vehicle equipment can rotate about the vehicle width direction. Due to this, when the rearward and downward collision load is applied to the in-vehicle equipment, the in-vehicle equipment can move to collapse rearward, by which the collision load applied to the in-vehicle equipment can be relieved. In addition, the guide member guides the in-vehicle equipment such that the in-vehicle equipment rotates about the vehicle width direction, and can facilitate the detachment of the first clip from the first fitting hole. In particular, in the embodiment in which the slit that extends upward from the first fitting hole is defined, providing such a guide member can facilitate the detachment of the first clip from the first fitting hole.

In the structure of the above embodiment, the cover panel may comprise a side panel portion extending rearward of the in-vehicle equipment. The side panel portion may be fixed to the in-vehicle equipment at a front portion of the side panel portion and may be fixed to the instrument panel at a rear portion of the side panel portion. The side panel portion may comprise a second clip projecting downward from a bottom surface of the rear portion of the side panel portion. The instrument panel may comprise a second fitting hole into which the second clip fits. The second fitting hole may extend rearward of a position where the second clip fits. In this embodiment, it can be said that the second fitting hole itself is an aspect of the impact relieving mechanism. In this embodiment, by virtue of the second fitting hole extending rearward, the second clip that is inserted into the second fitting hole can move rearward relative to the vehicle when the rearward and downward collision load is applied to the in-vehicle equipment. Consequently, the side panel portion can move rearward relative to the vehicle. Accordingly, movement of the in-vehicle equipment is not restricted by the side panel portion. Due to this, when the rearward and downward collision load is applied to the in-vehicle equipment, the in-vehicle equipment can move rearward and downward relative to the vehicle, by which the collision load applied to the in-vehicle equipment can be relieved.

Embodiment

Figure 1:
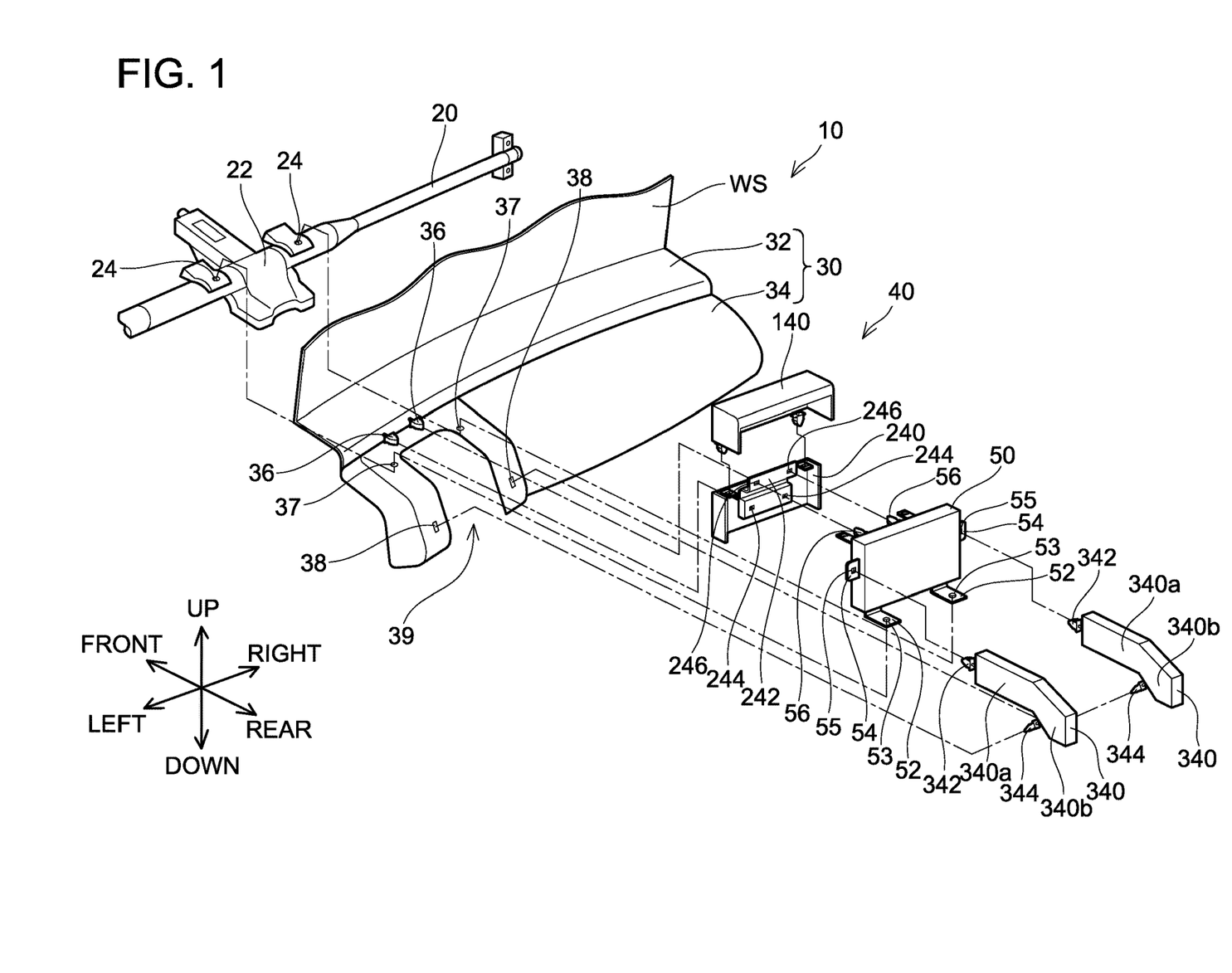
FIG. 1 schematically illustrates a disassembled perspective view of a structure 10 of a vehicle.

Hereafter, a structure 10 of a vehicle disposed at a front end of the vehicle will be described with reference to the drawings. As illustrates in FIG. 1, the structure 10 of the vehicle includes an instrument panel reinforcement 20, a windshield WS, an instrument panel 30, a cover panel 40, and in-vehicle equipment 50. In FIG. 1, each component is illustrated in a simplified manner for clearer illustration, and for example, illustrations of mechanisms such as vents for conditioning air and an opening for a center console defined in the instrument panel 30 are omitted. In addition, in this example, the cover panel 40 is configured as a member different from the instrument panel 30, however, the cover panel 40 may be configured integrally with the instrument panel 30.

(As to Instrument Panel Reinforcement)

As illustrated in FIG. 1, the instrument panel reinforcement 20 is disposed behind the instrument panel 30 (frontward of the instrument panel 30), and configured to support the instrument panel 30. The instrument panel reinforcement 20 extends along a vehicle width direction, and its right end is fixed to a right front pillar (not illustrated) and its left end is fixed to a left front pillar (not illustrated). A steering support 22 for supporting a steering column (not illustrated) and a steering wheel (not illustrated) is attached to the instrument panel reinforcement 20. Brackets are respectively fixed to left and right ends of the steering support 22, and insertion holes 24 into which fasteners for fixing the in-vehicle equipment 50 are to be inserted are respectively defined in the brackets.

(As to Instrument Panel)

As illustrated in FIG. 1, the instrument panel 30 is disposed at a front portion of a vehicle cabin, and extends along the vehicle width direction. Although not particularly limited, a surface of the instrument panel 30 that is exposed to the vehicle cabin has a double-stage structure, and the instrument panel 30 includes an instrument upper panel portion 32 that constitutes an upper stage of the instrument panel 30, and an instrument lower panel portion 34 that constitutes a lower stage of the instrument panel 30. The instrument upper panel portion 32 is configured with a substantially flat surface that slightly inclines downward and rearward relative to the vehicle from the front end of the vehicle. The instrument lower panel portion 34 is configured with a curved surface that curves rearward from the front end of the vehicle, and has a rearward convex shape. An opening 39 defined in the instrument lower panel portion 34 is a portion where the steering column (not illustrated) is to be disposed. The instrument upper panel portion 32 and the instrument lower panel portion 34 may be configured as different members, or may be configured integrally.

The instrument panel 30 includes a pair of clips 36 for fixing the cover panel 40. The pair of clips 36 is disposed at a wall portion extending between the instrument upper panel portion 32 and the instrument lower panel portion 34. A pair of insertion holes 37 into which the fasteners for fixing the in-vehicle equipment 50 are to be inserted and a pair of fitting holes 38 into which the clips for fixing the cover panel 40 fit are further defined in the instrument panel 30.

(As to Cover Panel)

As illustrated in FIG. 1, the cover panel 40 is a cover member provided to surround the in-vehicle equipment 50 such that a front surface of the in-vehicle equipment 50 is exposed to the vehicle cabin. The in-vehicle equipment 50 is a display configured to digitally display measurement values (e.g., a speed, a rotation speed of an engine or a motor), and the front surface exposed to the vehicle cabin is a screen. The cover panel 40 is fixed to an upper surface of the instrument panel 30 on a front side of the steering wheel (not illustrated), and includes an upper panel portion 140, a lower panel portion 240, and a pair of side panel portions 340.

The upper panel portion 140 is provided to face a back surface, an upper surface and side surfaces of an upper portion of the in-vehicle equipment 50, and covers the upper portion of the in-vehicle equipment 50. The upper panel portion 140 includes a pair of clips provided at a bottom surface of its rear wall, and is fixed to the lower panel portion 240 via this pair of clips. The upper panel portion 140 and the lower panel portion 240 may be configured integrally.

Figure 2:
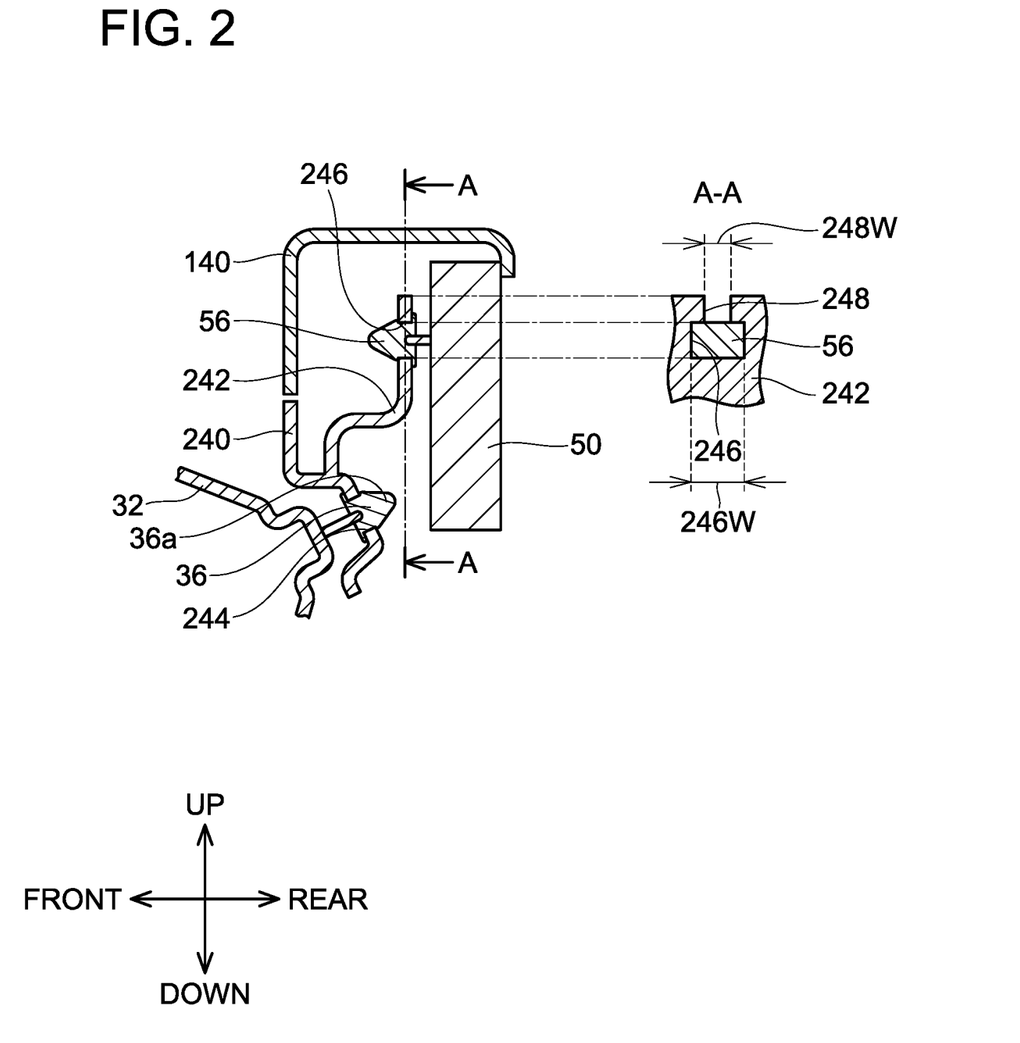
FIG. 2 schematically illustrates a cross-section, which is perpendicular to a vehicle width direction, of a primary section including a clip 36 of an instrument panel 30 and a clip 56 of in-vehicle equipment 50.

The lower panel portion 240 is provided to face a hack surface and side surfaces of a lower portion of the in-vehicle equipment 50, and covers the lower portion of the in-vehicle equipment 50. A recess is defined at a part of a rear wall of the lower panel portion 240, and a pair of fitting holes 244 is defined in the recess. As illustrated in FIG. 2, each of the clips 36 of the aforementioned instrument panel 30 fits into corresponding one of the pair of fitting holes 244. Each of the pair of clips 36 includes an elastic piece 36a disposed at its tip. When each of the clips 36 is inserted into its corresponding one of the fitting holes 244, its elastic piece 36a is pressed and inserted into the corresponding one of the fitting holes 244, thereby the elastic piece 36a fits into a surrounding wall that defines the corresponding one of the fitting holes 244. As such, the lower panel portion 240 is fixed to the instrument panel 30 via a fitting mechanism constituted of the clips 36 and the fitting holes 244. A type of the clips 36 is not particularly limited, and a different type of clips may be employed. In addition, although the same type of clips as the clips 36 are used for other clips 58, 344 which will be described later, different types of clips may be employed.

As illustrated in FIG. 1 and FIG. 2, the lower panel portion 240 includes a fixing plate 242 provided on its inner surface. The fixing plate 242 extends upward from the inner surface of the rear wall of the lower panel portion 240, and a pair of fitting holes 246 is defined therein. As illustrated in FIG. 2, a pair of clips 56 of the in-vehicle equipment 50, which will be described later, respectively fits into the pair of fitting holes 246.

Figure 4:
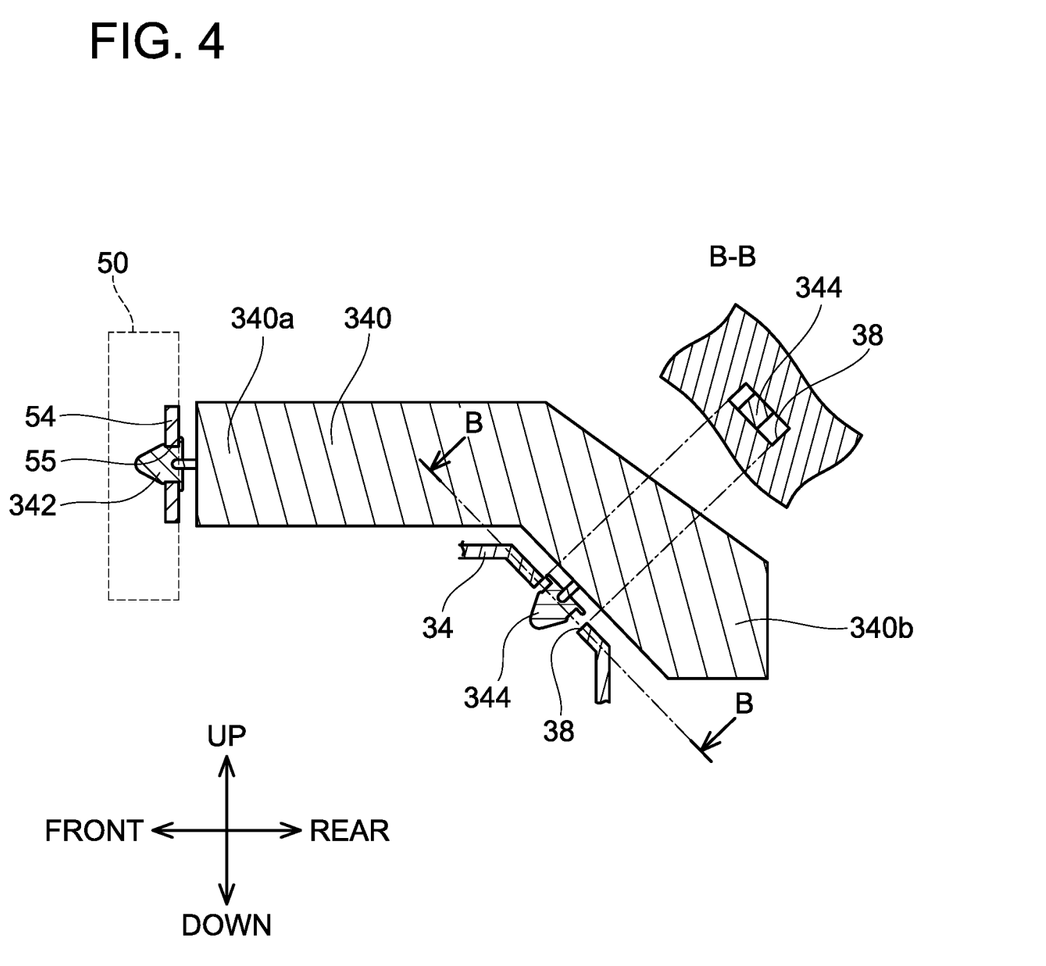
FIG. 4 schematically illustrates a cross-section, which is perpendicular to the vehicle width direction, of a primary section including a front clip 342 and a rear clip 344 of a side panel portion 340.

As illustrated in FIG. 1 and FIG. 4, each of the pair of side panel portions 340 extends rearward of the in-vehicle equipment 50, and is configured to, but not particularly limited to, be curved along a shape of the instrument lower panel portion 34. Each of the pair of side panel portions 340 includes a front clip 342 and a rear clip 344. The front clip 342 is disposed to protrude forward from a front surface of a front portion 340a located at a front portion of its corresponding side panel portion 340, and fixed to the in-vehicle equipment 50. The rear clip 344 is disposed to protrude forward and downward from a bottom surface of a rear portion 340b located at a rear portion of its corresponding side panel portion 340 and fits into corresponding one of the fitting holes 38 defined in the instrument lower panel portion 34. As such, the in-vehicle equipment 50 is indirectly fixed to the instrument lower panel portion 34 via the pair of side panel portions 340.

(As to In-Vehicle Equipment)

As illustrated in FIG. 1, the in-vehicle equipment 50 is covered by the cover panel 40 such that its front surface (the screen) is exposed to the vehicle cabin. The in-vehicle equipment 50 includes a pair of bottom surface fixing plates 52 provided at its bottom surface, a pair of side surface fixing plates 54 respectively provided at its side surfaces, and the pair of clips 56 provided at its back surface. Insertion holes 53 into which fasteners are to be inserted are respectively defined in the pair of bottom surface fixing plates 52. Fitting holes 55 into which the clips 342 are to fit are respectively defined in the pair of side surface fixing plates 54.

Figure 3:
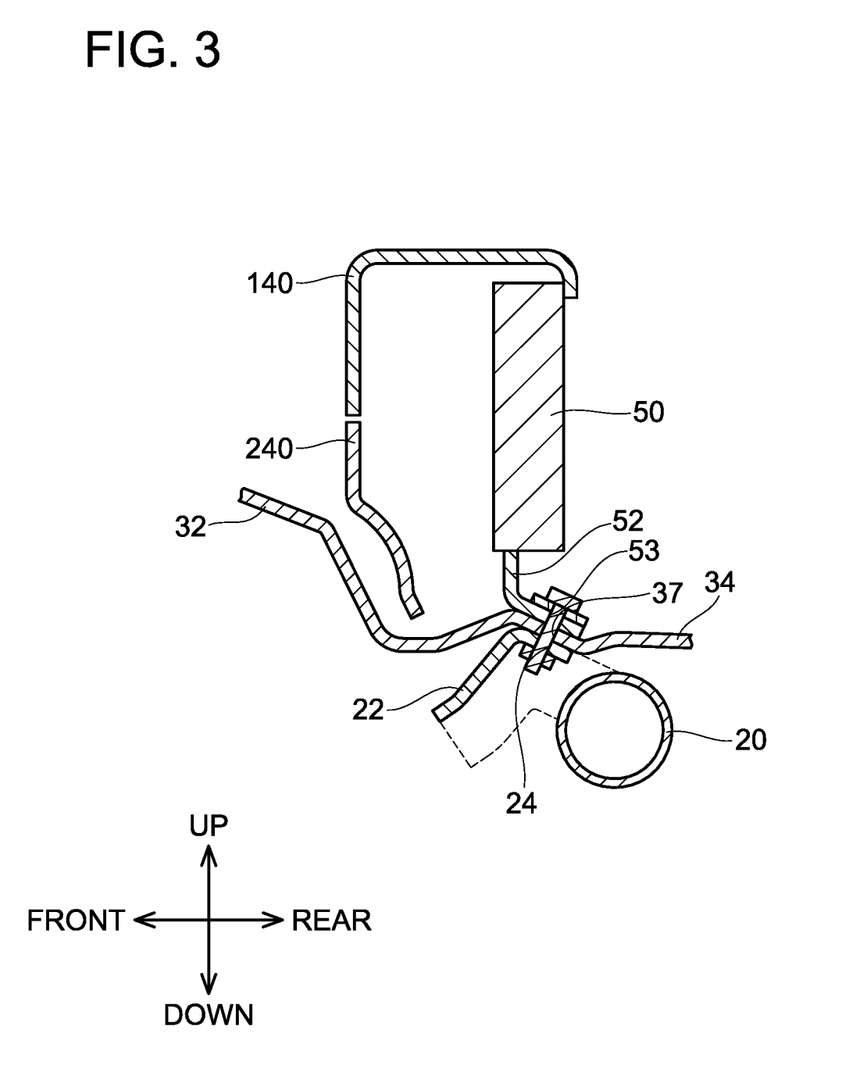
FIG. 3 schematically illustrates a cross-section, which is perpendicular to the vehicle width direction, of a primary section including an insertion hole 53 defined in a bottom surface fixing plate 52 of the in-vehicle equipment 50.

As illustrated in FIG. 3, the in-vehicle equipment 50, the instrument lower panel portion 34 and the instrument panel reinforcement 20 are fastened by bolts (examples of the fastener) each penetrating one of the insertion holes 53 of the bottom surface fixing plates 52 of the in-vehicle equipment 50, corresponding one of the insertion holes 37 of the instrument lower panel portion 34 and corresponding one of the insertion holes 24 of the steering support 22 of the instrument panel reinforcement 20. As illustrated in FIG. 4, the front clip 342 of each of the side panel portions 340 fits into corresponding one of the fitting holes 55 of the side surface fixing plates 54 of the in-vehicle equipment 50.

(As to Impact Relieving Mechanism)

As described above, in the structure 10 of the vehicle of the present embodiment, the in-vehicle equipment 50 is disposed to project upward above the upper surface of the instrument panel 30, by which the windshield WS and the in-vehicle equipment 50 are disposed in proximity to each other. Due to this, if an accident in which the vehicle hits a pedestrian occurs, a head of the pedestrian may collide into the windshield WS of the vehicle and collie with the in-vehicle equipment 50 through the broken windshield WS. Since the windshield WS is inclined upward and rearward relative to the vehicle, a downward and rearward collision load is applied to the in-vehicle equipment 50 when the head collides with the in-vehicle equipment 50 through the broken windshield WS. In the structure 10 of the vehicle of the present embodiment, an impact relieving mechanism configured to relieve the rearward and downward collision load applied to the in-vehicle equipment 50 is disposed. This impact relieving mechanism will be described below.

(As to First Impact Relieving Mechanism)

As illustrated in FIG. 2, the fitting holes 246 are defined in the fixing plate 242 that extends upward from the lower panel portion 240 of the cover panel 40, and the clips 56 of the in-vehicle equipment 50 fits into the fitting holes 246. Due to this, the in-vehicle equipment 50 is fixed to the instrument panel 30 via the lower panel portion 240. As illustrated in the cross-section of FIG. 2 taken along an A-A line, slits 248 that respectively extend upward from the fitting holes 246 are defined in parts of the fixing plate 242 defining upper walls of the fitting holes 246. Each of the parts of the fixing plate 242 defining the upper walls of the fitting holes 246 is separated by the slits 248.

A width 248W of each of the slits 248 in the vehicle width direction is narrower than a width 246W of each of the fitting holes 246 in the vehicle width direction. Due to this, even when the slits 248 are defined, the clips 56 are optimally and respectively fit into the fitting holes 246. On the other hand, when the rearward and downward collision load is applied to the in-vehicle equipment 50, the clips 56 can easily be detached from the fitting holes 246 via the slits 248. Due to this, when the rearward and downward collision load is applied to the in-vehicle equipment 50, the in-vehicle equipment 50 can move rearward and downward relative to the vehicle, by which the collision load applied to the in-vehicle equipment 50 can be relieved. The clips 56 are examples of the first clip, and the fitting holes 246 are examples of the first fitting hole.

Instead of the slits 248, fragile portions of which strengths are less than that of the fixing plate 242 around the fragile portions may be provided at portions corresponding to the slits 248. Such fragile portions may be, for example, configured from a material having weaker strength than that of the fixing plate 242, configured by reducing a thickness of portions of the fixing plate 242 to be configured as fragile portions as compared to the fixing plate 242 therearound, or configured by defining a plurality of holes in the fixing plate 242. When the rearward and downward collision load is applied to the in-vehicle equipment 50, such fragile portions break, thereby the clips 56 can easily be detached from the fitting holes 246.

(As to Second Impact Relieving Mechanism)

As illustrated in FIG. 4, the front clip 342 of each of the side panel portions 340 fits into the corresponding one of the fitting holes 55 defined in the side fixing plates of the in-vehicle equipment 50, and a rear clip 344 of each of the side panel portions 340 fits into the corresponding one of the fitting holes 38 defined in the instrument lower panel portion 34. Due to this, the in-vehicle equipment 50 is indirectly fixed to the instrument lower panel portion 34 via the pair of side panel portions 340. As illustrated in the cross-section taken along a B-B line of FIG. 4, each of the fitting holes 38 defined in the instrument lower panel portion 34 extends rearward of a position where the rear clip 344 fits.

By virtue of the fitting holes 38 extending rearward relative to the vehicle, the rear clip 344 can move rearward within corresponding one of the fitting holes 38. Due to this, when the rearward and downward collision load is applied to the in-vehicle equipment 50, the side panel portions 340 can move rearward, by which reaction force applied from the side panel portions 340 to the in-vehicle equipment 50 when the in-vehicle equipment 50 moves rearward and downward relative to the vehicle can be reduced. Accordingly, when the rearward and downward collision load is applied to the in-vehicle equipment 50, the in-vehicle equipment 50 can move downward and rearward relative to the vehicle, by which the collision load applied to the in-vehicle equipment 50 can be relieved. The rear clip 344 is an example of the second clip, and the fitting holes 38 are examples of the second fitting hole.

(As to Third Impact Relieving Mechanism)

Figure 5:
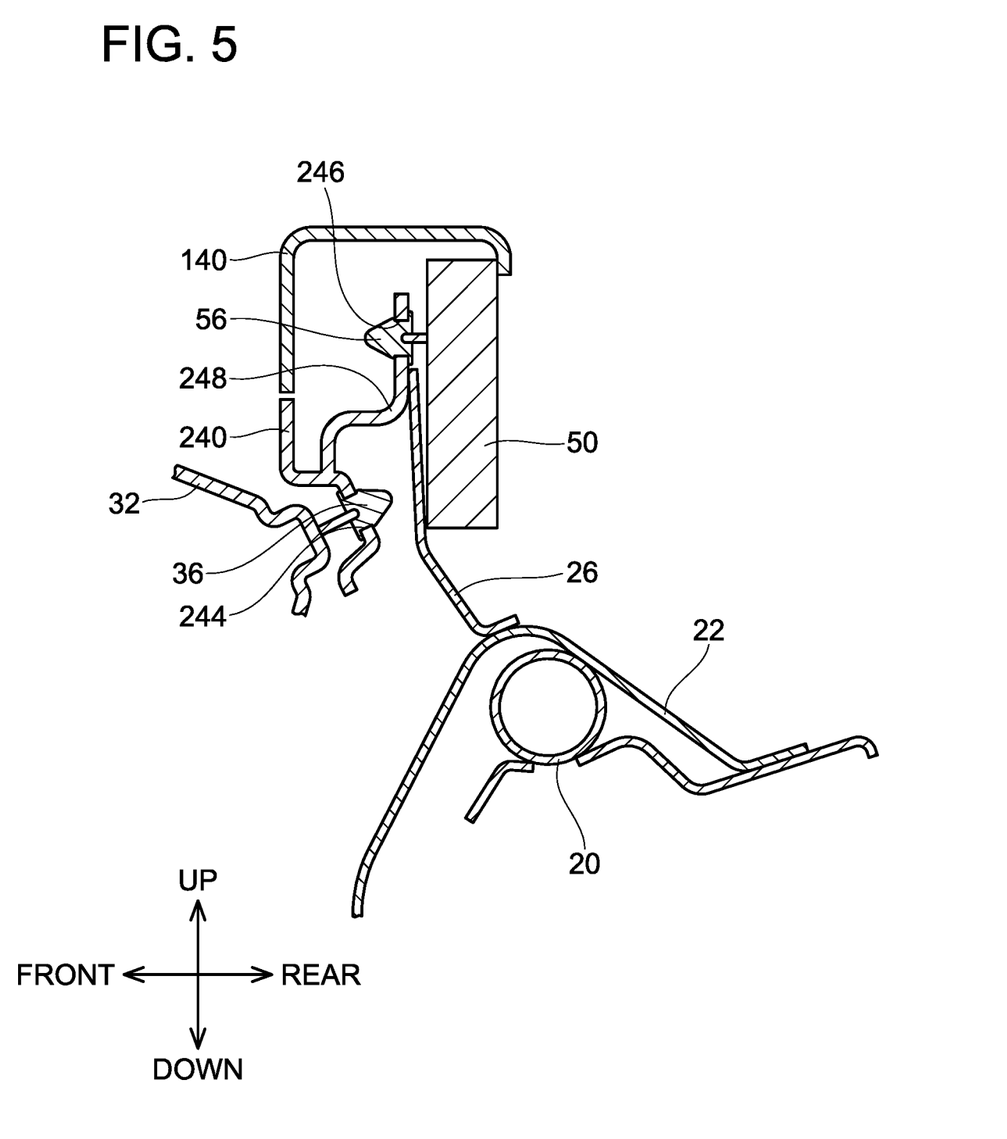
FIG. 5 illustrates an example of a variant of the structure 10 of the vehicle, and schematically illustrates a cross-section of a primary section corresponding to FIG. 2.

FIG. 5 illustrates a variant of the structure 10 of the vehicle. The instrument panel reinforcement 20 of this example includes a bracket 26 disposed below the clips 56 to face the clips 56. A base end of the bracket 26 is fixed to the steering support 22, and a top end thereof extends toward a position proximate to the clips 56. The base end of the bracket 26 may be fixed to the instrument panel 30.

When the rearward and downward collision load is applied to the in-vehicle equipment 50, the in-vehicle equipment 50 moves rearward and downward relative to the vehicle. At this occasion, the bracket 26 makes contact with the clips 56, by which an upward load can be applied to the clips 56. Due to this, the bracket 26 can facilitate breakage of the clips 56 or detachment of the clips 56 from the fitting holes 246. As such, when the rearward and downward collision load is applied to the in-vehicle equipment 50, the in-vehicle equipment 50 can move rearward and downward relative to the vehicle, by which the collision load applied to the in-vehicle equipment 50 can be relieved. In particular, in the aforementioned example in which the slits 248 extending upward from the fitting holes 246 are defined, providing the bracket 26 as described above can efficiently facilitate the detachment of the clips 56 from the fitting holes 246.

(As to Fourth Impact Relieving Mechanism)

Figure 6:
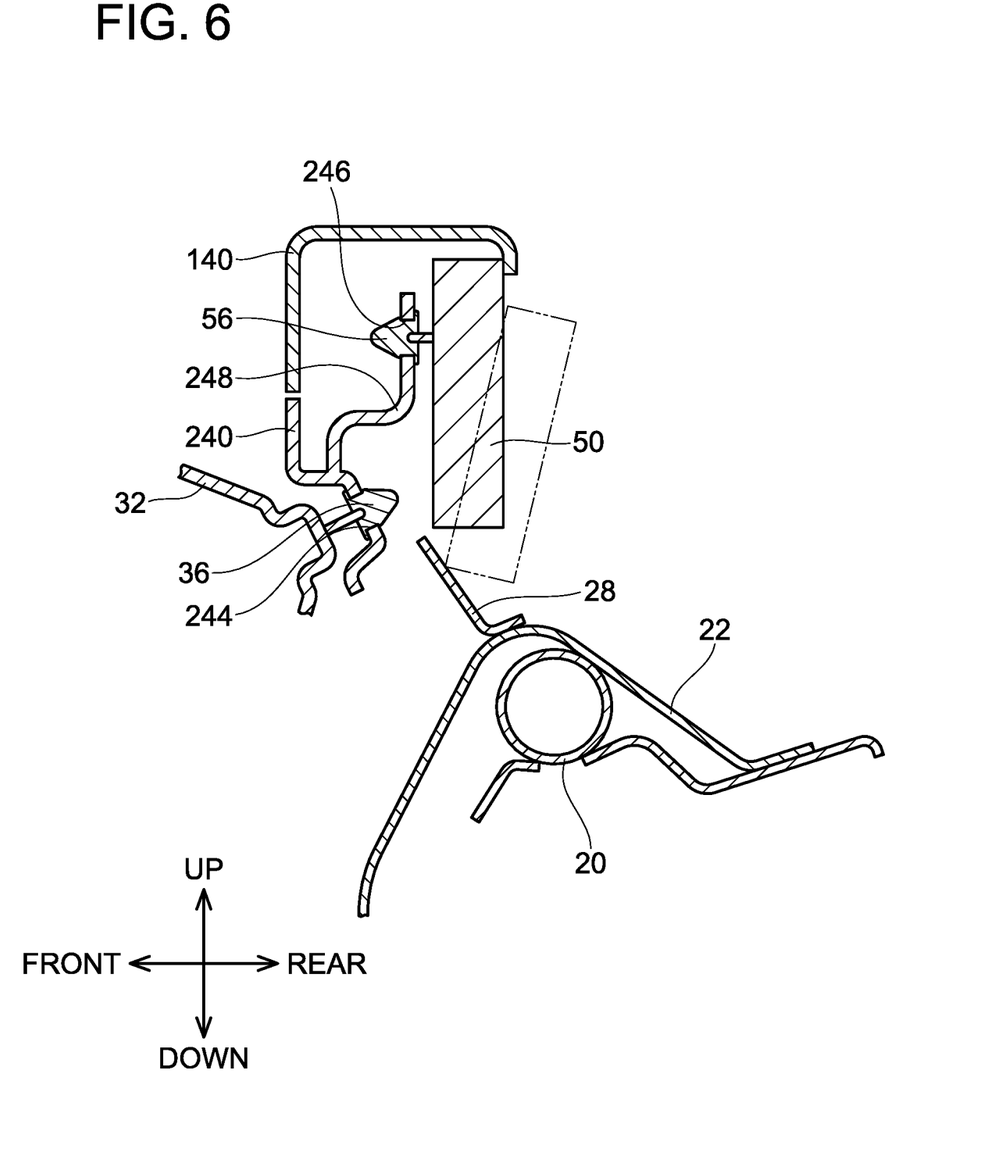
FIG. 6 illustrates another example of the variant of the structure 10 of the vehicle, and schematically illustrates a cross-section of a primary section corresponding to FIG. 2

FIG. 6 illustrates a variant of the structure 10 of the vehicle. The instrument panel reinforcement 20 of this example includes a guide member 28 located below the in-vehicle equipment 50. The guide member 28 includes an inclined surface inclined rearward and downward and facing a bottom surface of the in-vehicle equipment 50, and its base end is fixed to the steering support 22. The base end of the guide member 28 may be fixed to the instrument panel 30.

When the rearward and downward collision load is applied to the in-vehicle equipment 50, the in-vehicle equipment 50 moves rearward and downward relative to the vehicle. At this occasion, a front edge of the bottom surface of the in-vehicle equipment 50 makes contact with the inclined surface of the guide member 28. When viewed along the vehicle width direction, the in-vehicle equipment 50 can rotate about this contact point as its rotation axis (a broken line indicates the in-vehicle equipment 50 that has rotated). As such, when the rearward and downward collision load is applied to the in-vehicle equipment 50, the in-vehicle equipment 50 can move to collapse rearward, by which the collision load applied to the in-vehicle equipment 50 can be relieved. In addition, the guide member 28 guides the in-vehicle equipment 50 to rotate, and can facilitate the detachment of clips 56 from the fitting holes 246. In particular, in the example in which the slits 248 that extend upward from the first fitting holes 246 are defined, providing the guide member 28 as above can facilitate the detachment of the clips 56 from the fitting holes 246.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A structure of a vehicle comprising:
   a windshield;
   an instrument panel located below the windshield;
   in-vehicle equipment disposed such that the in-vehicle equipment projects upward above an upper surface of the instrument panel and is fixed to the instrument panel, wherein the in-vehicle equipment comprises a first clip projecting frontward from a rear surface of the in-vehicle equipment;
   a cover panel provided on the upper surface of the instrument panel and covering the in-vehicle equipment such that a front surface of the in-vehicle equipment is exposed to a vehicle cabin, wherein the cover panel comprises a first fitting hole into which the first clip fits; and
   an impact relieving mechanism configured with the first clip and the first fitting hole, wherein the impact relieving mechanism is configured to enable the in-vehicle equipment to move rearward and downward by detaching the first clip from the first fitting hole.

2. The structure according to claim 1, wherein
   the cover panel includes a part defining an upper wall of the first fitting hole, and
   the impact relieving mechanism comprises a slit defined in the part of the cover panel and extending upward from the first fitting hole.

3. The structure according to claim 1, wherein
   the impact relieving mechanism comprises a bracket located below the first clip and facing the first clip.

4. The structure according to claim 1, wherein
   the relieving mechanism comprises a guide member located below the in-vehicle equipment, and
   the guide member comprises an inclined surface inclined rearward and downward and facing a bottom surface of the in-vehicle equipment.

5. The structure according to claim 1, wherein
   the cover panel comprises a side panel portion extending rearward of the in-vehicle equipment,
   the side panel portion is fixed to the in-vehicle equipment at a front portion of the side panel portion and is fixed to the instrument panel at a rear portion of the side panel portion, the side panel portion comprises a second clip projecting downward from a bottom surface of the rear portion of the side panel portion,
the instrument panel comprises a second fitting hole into which the second clip fits, and
the second fitting hole extends rearward of a position where the second clip fits.

\* \* \* \* \*